United States Patent [19]

Jabbar et al.

[11] Patent Number: 5,283,491
[45] Date of Patent: Feb. 1, 1994

[54] AIR-BEARING MOTOR ASSEMBLY FOR MAGNETIC RECORDING SYSTEMS

[75] Inventors: Mohammed A. Jabbar; Ali A. Talukder, both of Singapore, Singapore

[73] Assignee: Maxtor Corporation, San Jose, Calif.

[21] Appl. No.: 2,741

[22] Filed: Jan. 11, 1993

[51] Int. Cl.⁵ .................... H02K 5/16; F16C 17/00
[52] U.S. Cl. ........................... 310/90; 384/275
[58] Field of Search ............... 310/67 R, 90, 156; 360/102, 103, 135; 384/261, 275, 372, 909, 901

[56] References Cited

U.S. PATENT DOCUMENTS

| | | | |
|---|---|---|---|
| 5,073,037 | 12/1991 | Fujikawa et al. | 384/107 |
| 5,127,744 | 7/1992 | White et al. | 384/112 |
| 5,168,186 | 12/1992 | Yashiro | 310/156 |

Primary Examiner—Steven L. Stephan
Assistant Examiner—Matthew Nguyen
Attorney, Agent, or Firm—Blakely, Sokoloff, Taylor & Zafman

[57] ABSTRACT

An electric motor for a magnetic disk memory device includes a conical hub and a conical plane or grooved base and an integral air-bearing which significantly reduces non-repeatable runout, audible noise, and vibration. The base is rigidly attached to the shaft while the hub, which carries all of the load, rotates on the air cushion created by a pressurized air film. An upper sleeve controls the pressure fluctuation in the air film in a dynamic condition. In a static condition, the hub rests on a dry lubricated surface. The force developed due to the pressurized air film balances the rotating member in any condition.

25 Claims, 12 Drawing Sheets

FIG_1
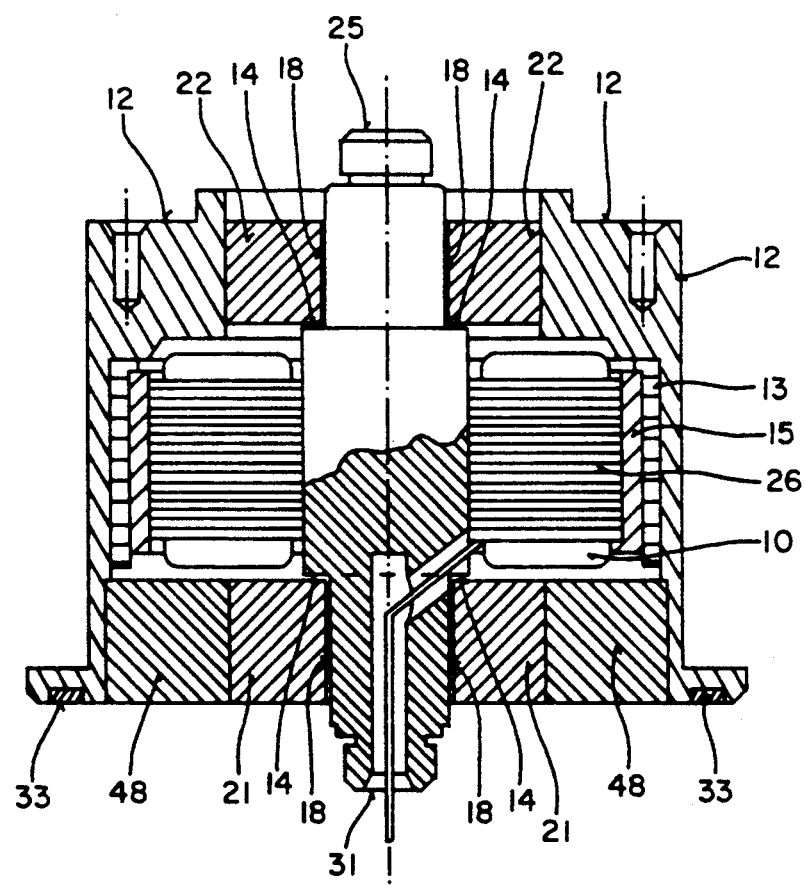

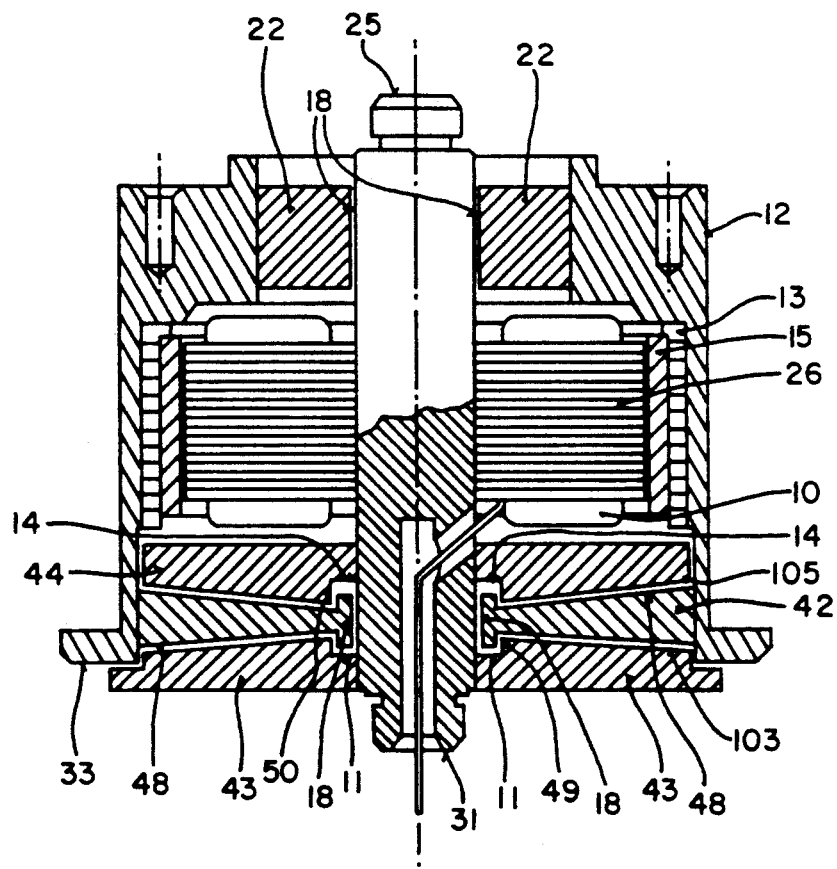
FIG_2

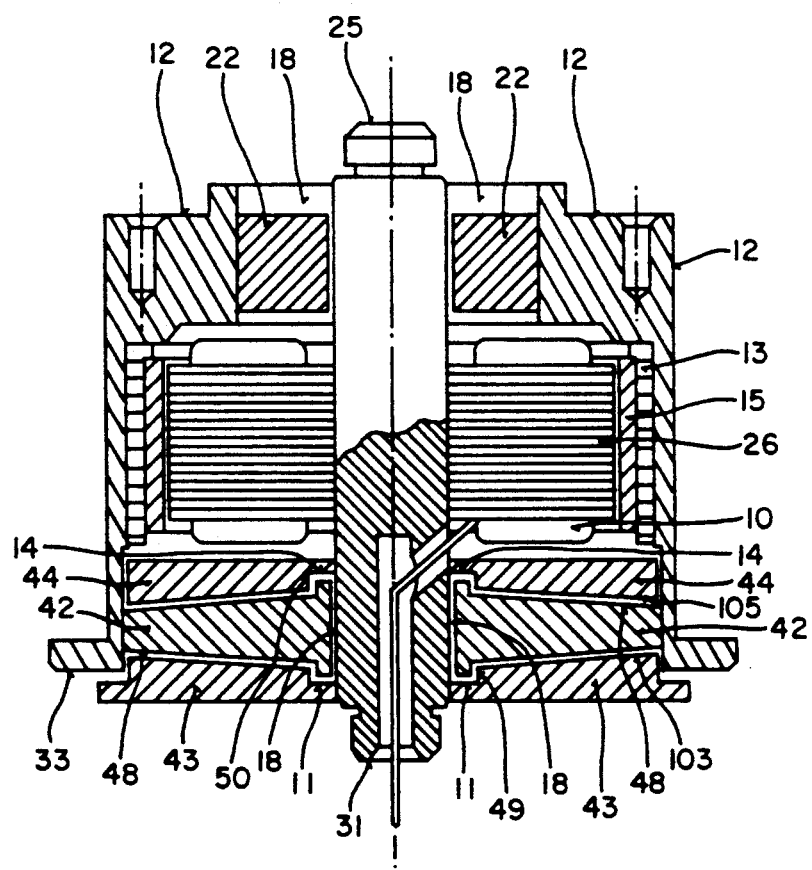
FIG_3

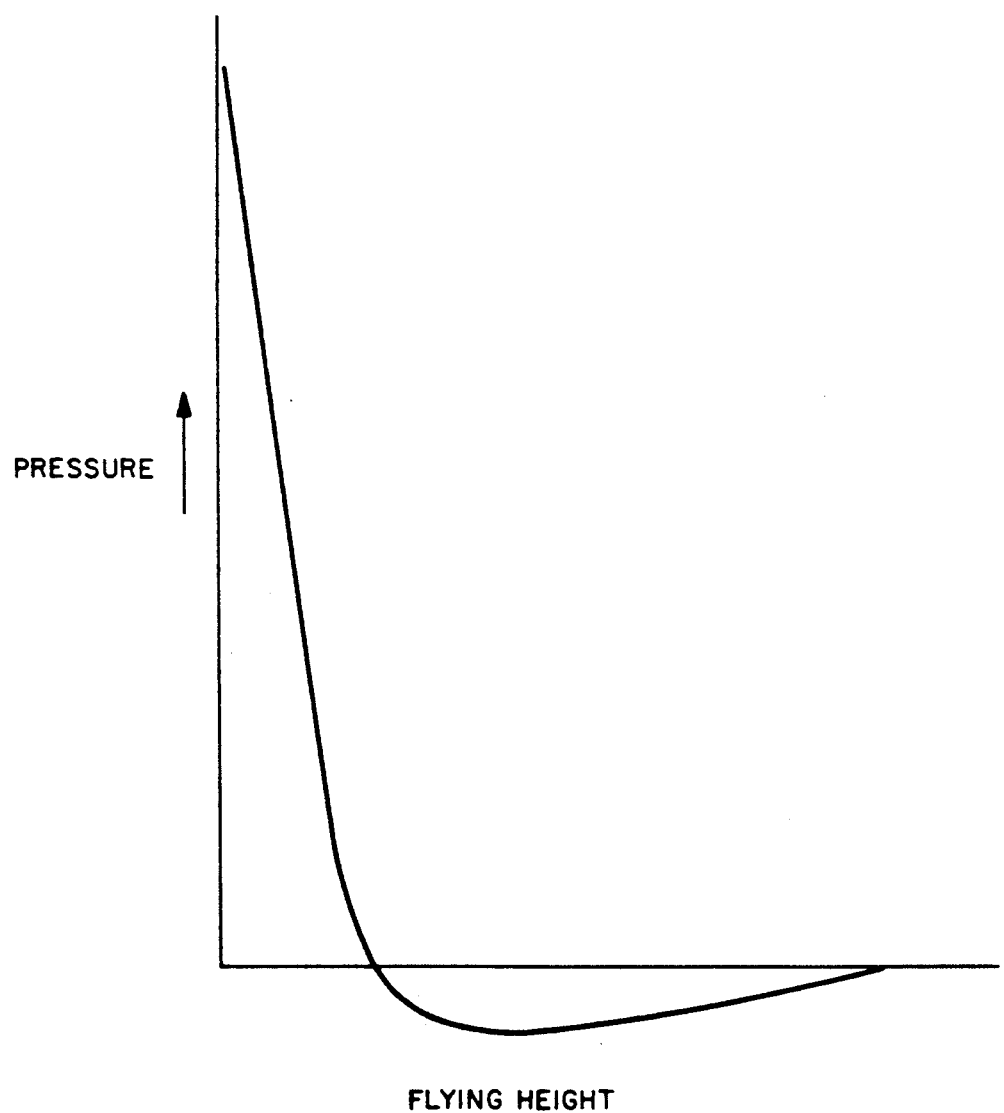

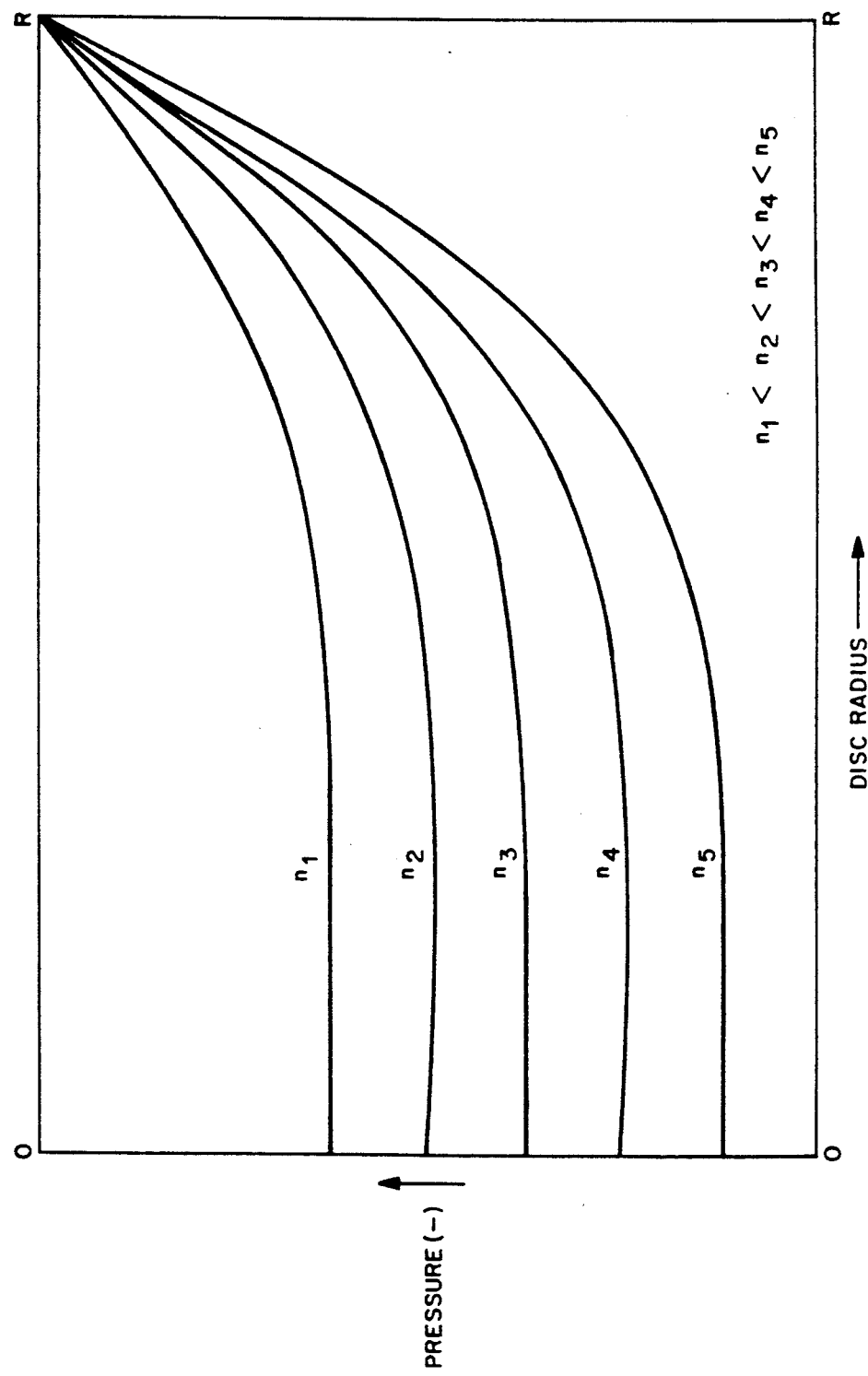

FIG _ 6A
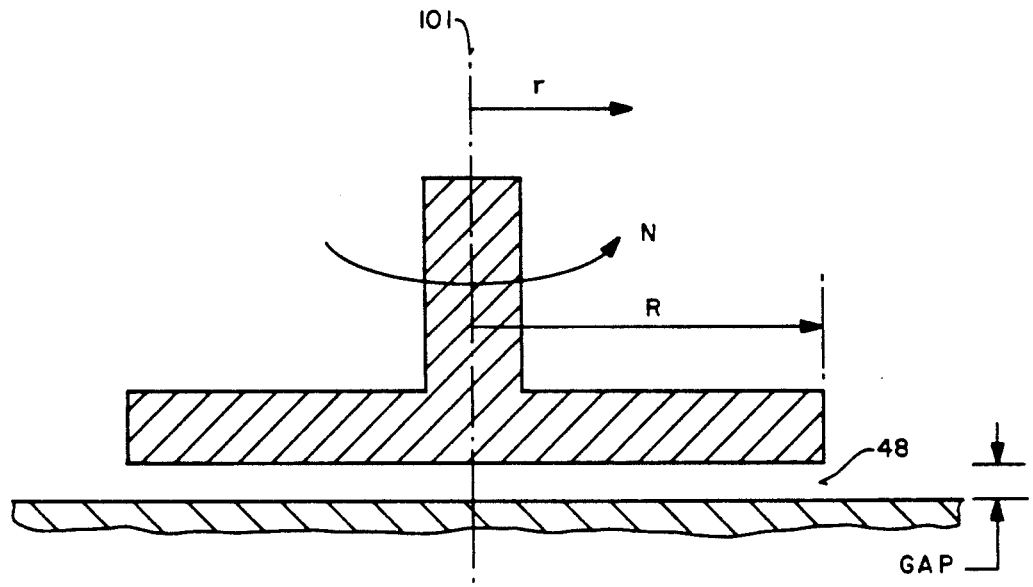
FIG _ 6B
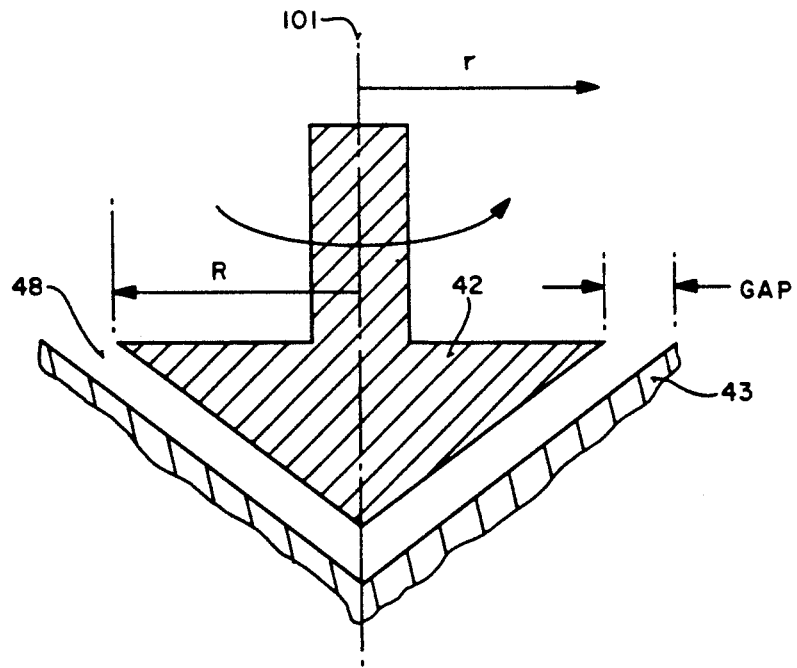

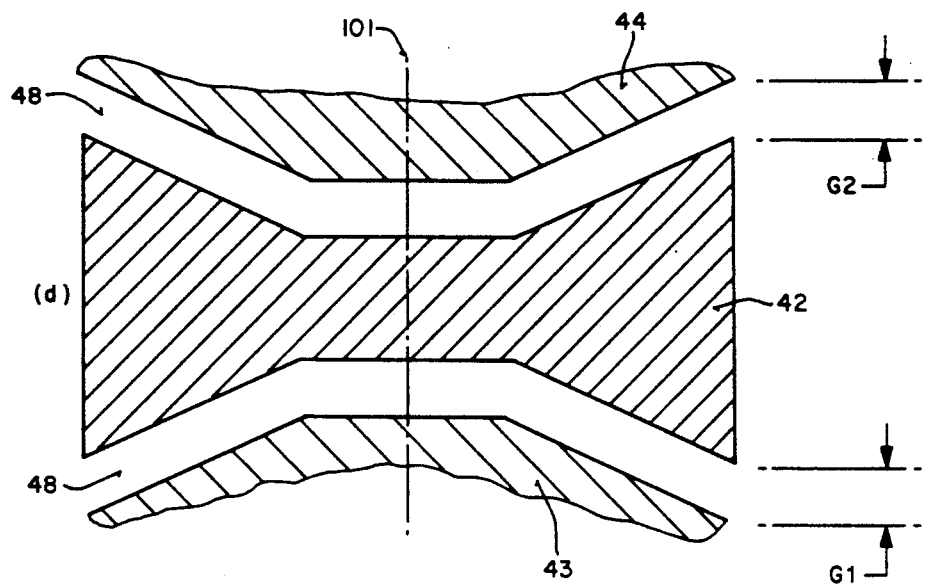
FIG_6C
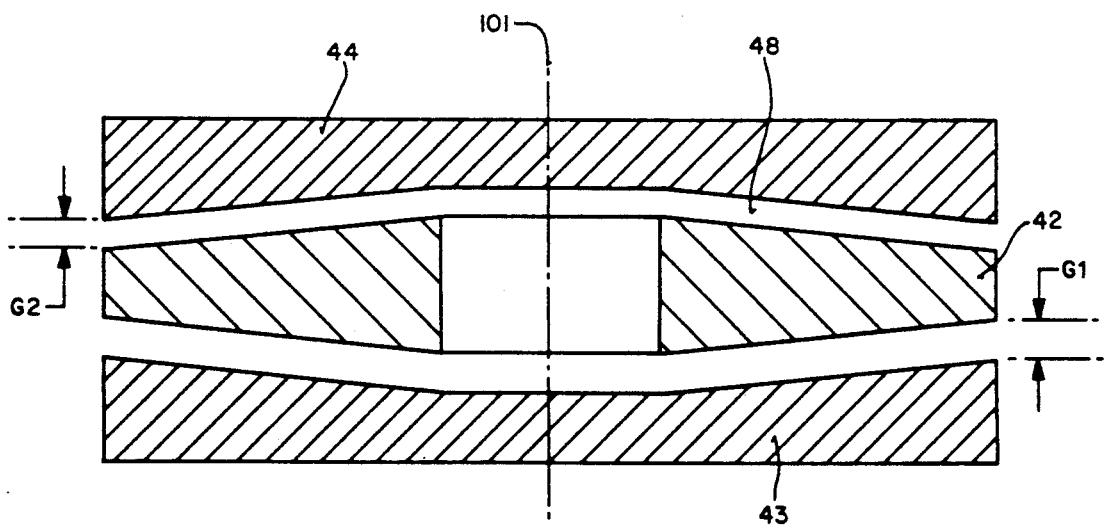
FIG_6D

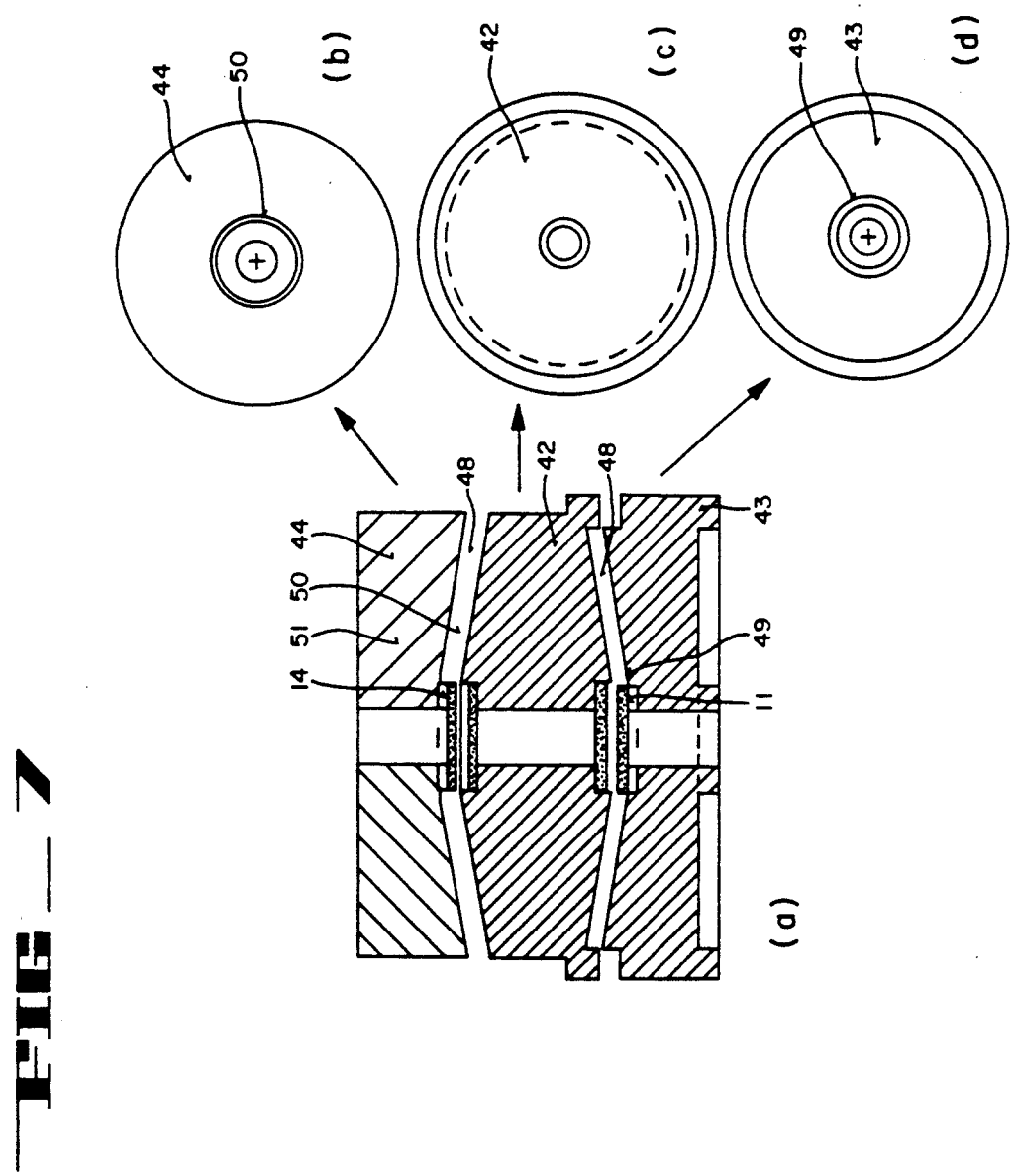

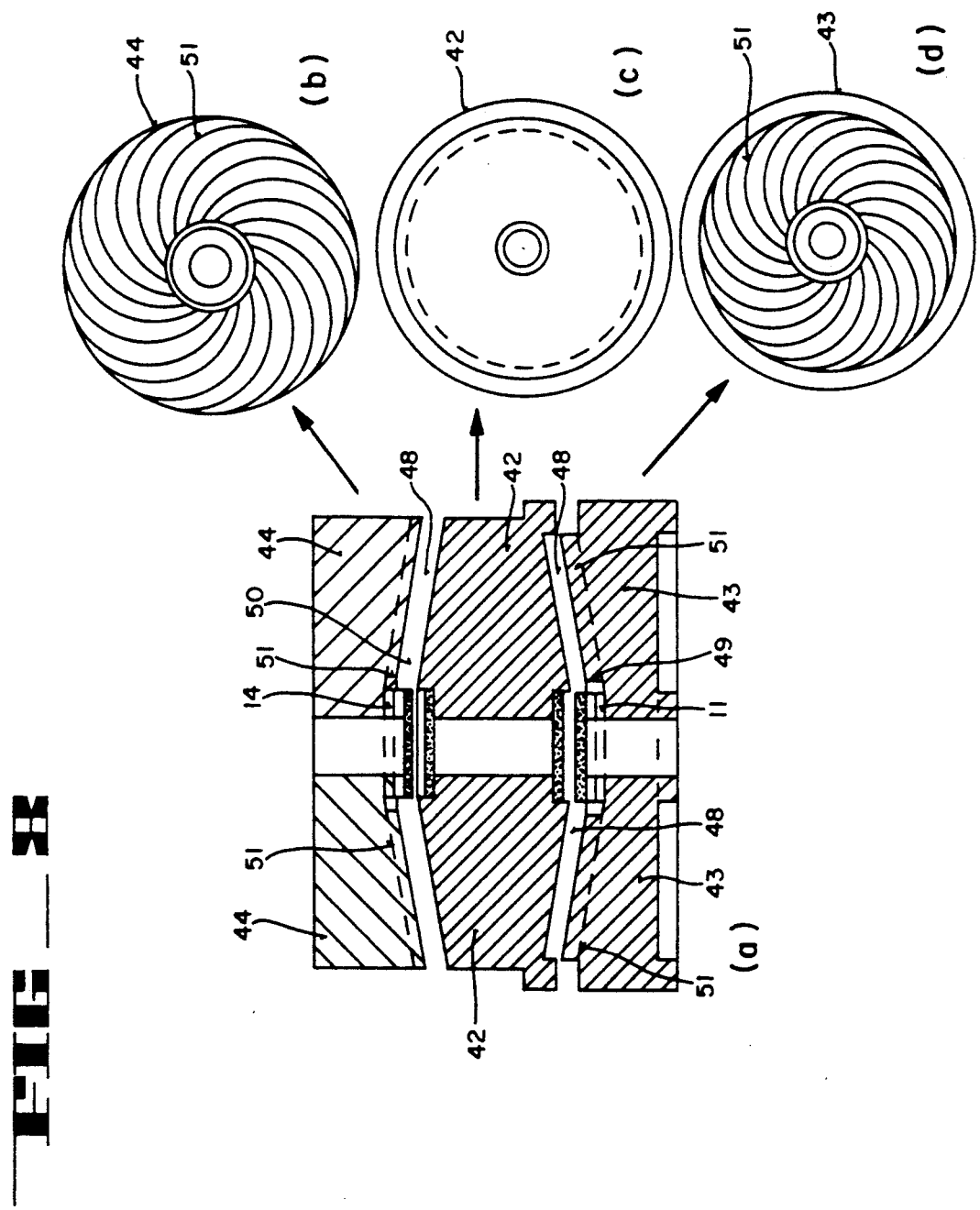

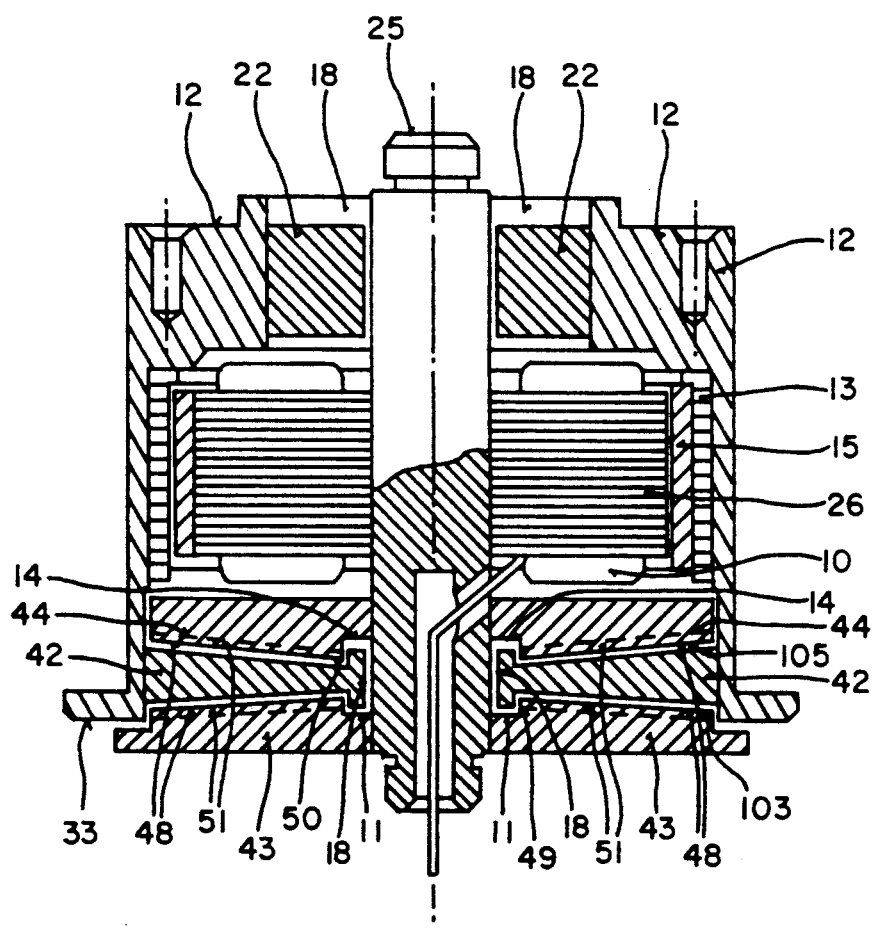
FIG_9

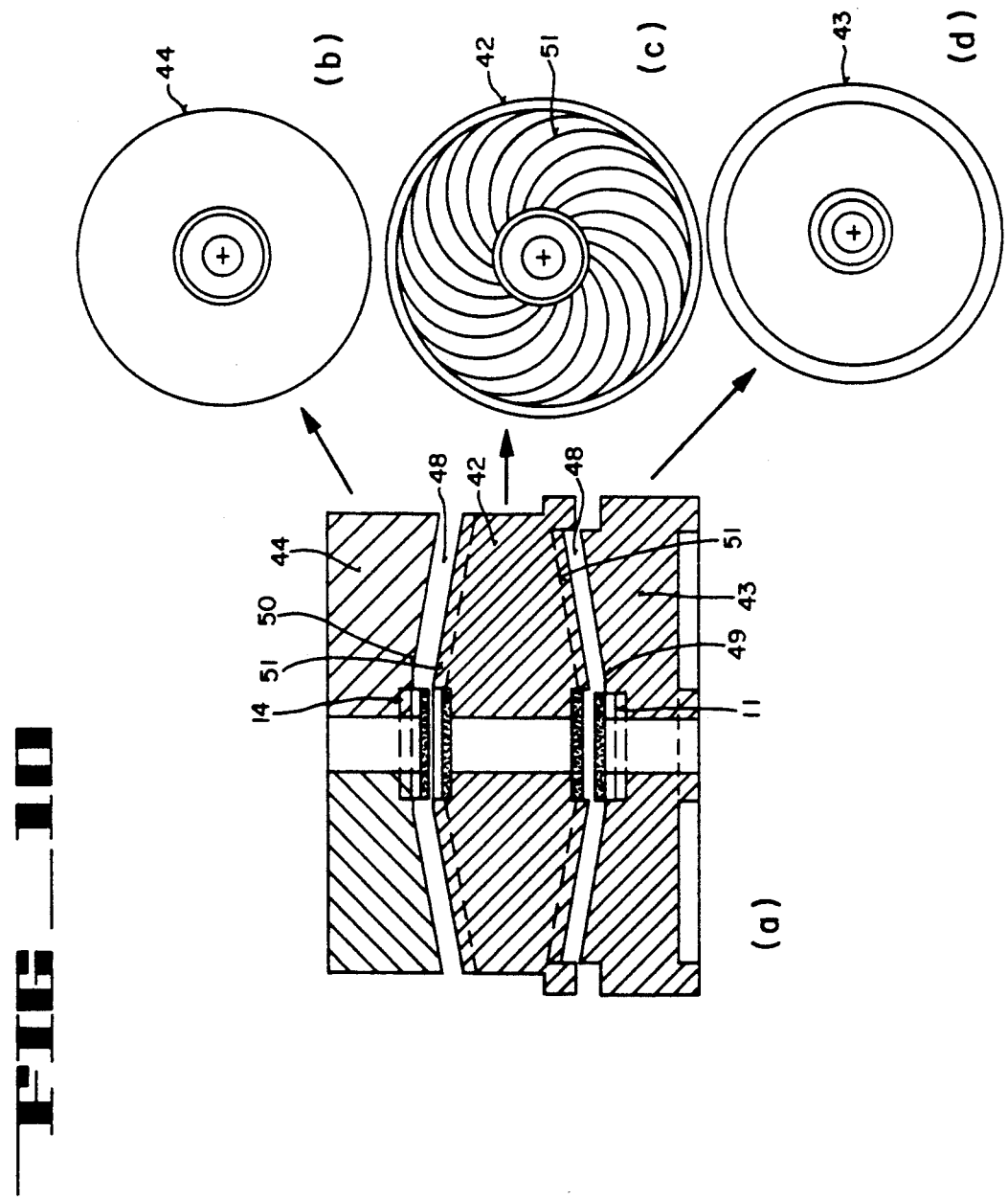
FIG_10

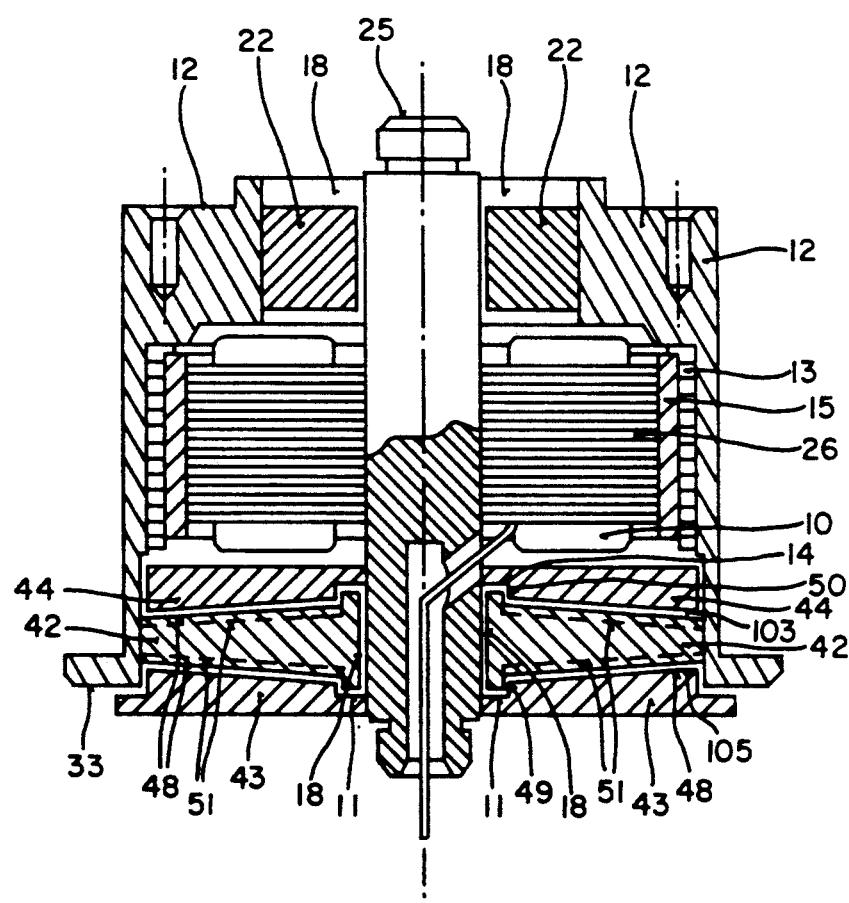
FIG_11

AIR-BEARING MOTOR ASSEMBLY FOR MAGNETIC RECORDING SYSTEMS

FIELD OF THE INVENTION

The present invention relates to the field of magnetic disk memory devices and, more specifically, to spindle motors utilized in such digital storage systems.

BACKGROUND OF THE INVENTION

Disk drive memory systems have been used in computers for many years for storage of digital information. The digital information is recorded on concentric memory tracks of a magnetic disk medium. (The actual information is stored in the form of magnetic transitions within the medium.) The disks themselves are rotatably mounted on a spindle, and information is accessed by means of read/write heads generally located on pivoting arms which move radially over the surface of the disk. The read/write heads, or transducers, must be accurately aligned with the storage tracks on the disk to ensure proper reading and writing of information.

During operation, the disks are rotated at very high speeds by means of an electric motor generally located inside the hub or below the spindle. One type of motor is commonly known as an "in-hub" or "in-spindle" motor. In this type of motor assembly the drive motor is incorporated within the spindle itself. Such a motor assembly is described in U.S. Pat. Nos. 4,754,353 and 4,928,029, both of which are assigned to the assignee of the present application. In-spindle motors have a spindle which is mounted by means of two ball-bearing systems to a non-rotating motor shaft disposed in the center of the hub. One of the bearings is typically located at the top of the spindle and the other is located at the bottom of the spindle. These bearings allow for rotational movement between the shaft and the hub while maintaining accurate alignment of the spindle to the shaft. The bearings themselves are normally lubricated by grease or oil, which creates a hydrodynamic bearing surface during operation.

The conventional bearing system described above is prone to several shortcomings. First, there is the problem of friction generated on the ball bearing surface. Since the ball bearings are always in mechanical or physical contact with either the grease lubricating layer or with the motor shaft itself, resulting friction limits the maximum speed of rotation that can be achieved. In other words, hydrodynamic mechanical bearings of this type are severely limited to a maximum rotational speed. This limitation conflicts with the need to spin the magnetic disk at ever higher speeds in order to improve the overall performance of the disk drive system.

Moreover, mechanical bearings are not always scaleable to smaller dimensions. This is a significant drawback since the trend in the disk drive industry has been to continually shrink the physical dimensions of the disk drive unit. Furthermore, the frictional nature of the ball-bearings leads to wear on the associated parts, thereby shortening the lifetime of the motor.

Another problem is that the seals which confine the grease and oil lubricants within the bearing are subject to leakage with increased wear. Any leakage into the disk drive environment is potentially hazardous since outgasing of contaminants can cause flaws and other data errors within the system.

In an attempt to overcome the problems associated with traditional ball-bearing systems, an alternative motor design has been developed that utilizes a dynamic pressure-type cylindrical groove bearing. This design, which is sometimes referred to as an "under-slung" motor, relies upon pressurized gas in the radial bearing gap between the spindle and motor shaft. This air pressure is increased by a series of dynamic pressure generating grooves located on the outer surface of the motor shaft. An example of this type of magnetic disk drive motor is disclosed in U.S. Pat. No. 4,656,545.

While the under-slung motor design benefits from the use of air pressure bearings, the design is not without its drawbacks. For example, such designs typically require that the entire disk drive assembly including the magnetic disks themselves be totally enclosed within a pressurized air chamber. This means that the drive assembly must be hermetically sealed, which is often expensive and difficult to implement.

In another attempt to overcome the problems of ball-bearing systems, a spindle motor design based on a gas dynamic bearing using double-sided grooves to generate dynamic pressure was developed as disclosed in U.S. Pat. No. 4,998,033. The bearing part of the motor is positioned in a manner that resembles either an under-slung or an over-hang. This requires extra space and is not suitable for small form-factor drives. The design uses a high viscosity lubricant and requires more electrical power to overcome increased drag force. It has only an unidirectional thrust mechanism and cannot work in all dispositions (horizontal, upside down, etc.). The design also has an insufficient mechanism for preloading and has no mechanism for providing radial balance at the top to control run-out.

What is needed then is an air-bearing system for a magnetic recording motor assembly which offers a simple construction, yet is capable of being manufactured at low cost and in high volume. As will be seen, the present invention provides a self acting air-bearing system that utilizes pressurized air as a bearing lubricant to overcome the problems inherent in the prior art.

SUMMARY OF THE INVENTION

An air-bearing motor assembly for magnetic recording systems is disclosed. The primary advantages of using air as a bearing lubricant include a significantly lower coefficient of viscosity as compared to conventional hydrodynamic bearing systems. Hence, the power demand in the present invention is extremely low while the load carrying capacity remains essentially constant.

In one embodiment, the present invention comprises a motor assembly having a cylindrical shaft onto which is secured a stator. The stator has an electromagnetic coil disposed about the longitudinal axis of the shaft. Both the stator and the shaft are housed within a rotatable hub. A plurality of information recording magnetic disks are mounted in axially spaced apart relationship on the outer peripheral portion of the rotatable hub. Within the hub, a magnet means is attached and disposed radially about the stator for interacting electromagnetically with the coil to cause rotation of the hub relative to the shaft during normal operation.

The motor assembly also includes a pair of cylindrical sleeve members affixed to the hub and disposed about respective first and second ends of the shaft. Each of the sleeve members has a dry lubricated surface of a predetermined radial dimension which is calculated to be slightly larger than the radial dimension associated with the shaft. This creates a gap between the shaft and each of the sleeve members. Upon rotation of the hub relative to the shaft a pressurized air film develops within the gaps. It is these pressurized air films that function as the bearings for the system. The dimension of the gaps is preferably optimized based on the surface area of the bearings, the rotational speed of the hub, and the various loads that are supported. The gap-forming surfaces create axial force through pressure generation between the closely matched surfaces, and maintain the axial load and stiffness requirements.

The present invention is further characterized by its simple construction and its relatively low cost. Because the drive itself is normally in an air-ambient, there is no need to hermetically seal the motor assembly. Also, since air is chemically stable, the problem of outgasing into the disk drive environment is non-existent. In addition to being noiseless and vibration-free, the present invention is also characterized by a very long lifetime, since mechanical abrasion and wear are virtually eliminated.

BRIEF DESCRIPTION OF THE DRAWINGS

The novel features believed characteristic to the invention are set forth in the appended claims. The invention itself, however, as well as other features and advantages thereof, will be best understood by reference to the detailed description that follows, read in conjunction with the accompanying drawings wherein:

FIG. 1 is a cross-sectional side view of the motor assembly of the present invention.

FIG. 2 is a cross-sectional side view of the motor assembly according to an alternative embodiment of the present invention.

FIG. 3 is a cross-sectional side view of the motor assembly according to yet another alternative embodiment of the present invention.

FIG. 4 is a graph illustrating the relationship between flying height and pressure for a given speed.

FIG. 5 is a graph illustrating the relationship between air pressure and rotational speed at different radial positions.

FIG. 6a is a cross-sectional side view of a smooth disk rotating over a smooth surface.

FIG. 6b is a cross-sectional side view of a conical body rotating over a conical fixed surface.

FIG. 6c is a cross-sectional view of a double conical body rotating inside of a double conical surface.

FIG. 6d is a cross-sectional view of an alternative arrangement of FIG. 6c.

FIGS. 7a–7d are a cross-sectional view of the sub-assembly of an air-bearing.

FIGS. 8a–8d are a cross-sectional view of the sub-assembly of a groove air-bearing.

FIG. 9 is a cross-sectional view of the motor assembly according to a presently preferred embodiment of the present invention.

FIGS. 10a–10d are an alternative cross-sectional view of the sub-assembly of FIG. 8.

FIG. 11 is an alternative cross-sectional view of the motor assembly of FIG. 9.

DETAILED DESCRIPTION

An in-spindle motor assembly for use in disk drive computer systems is disclosed. In the following description, numerous specific details are set forth, such as specific material types, thicknesses, speeds, etc., in order to provide a thorough understanding of the invention. It will be obvious, however, to one skilled in the art that these specific details need not be used to practice the present invention. In other instances, well-known structures and processing steps have not been described in particular detail in order to avoid unnecessarily obscuring the present invention.

With reference to FIG. 1, a cross-sectional side view of one embodiment of the motor assembly of the present invention is shown. The motor assembly of FIG. 1 comprises a cylindrical steel motor shaft 25 onto which is attached a stator 26. The stator 26 includes a laminated core and a series of coils 10 disposed around the laminated core. Both the stator 26 and the motor shaft 25 are disposed within a hub 12 which has a cylindrical hole running through it to accommodate cylindrical sleeve member 22. Hub 12 preferably comprises aluminum.

Stator 26 resides within an internal cavity of hub 12. Attached to hub 12 within the internal cavity are permanent magnets 15, sleeve 48, and hollow cylinder 13. Hollow cylinder 13 preferably comprises a ferromagnetic material such as steel so as to provide a flux path for magnets 15. Magnets 15 interact electromagnetically with coil 10 to cause rotational movement of hub 12 relative to motor shaft 25 during normal operation. Electrical activation of coils 10 is achieved by means of terminal leads which connect to the stator 26 through a passage 31 centrally disposed through motor shaft 25. In the presently preferred embodiment, hub 12 also includes a flux ring or commutator 33. (Note that this element is not necessary for sensorless disk drive systems.)

The two cylindrical sleeve members 21 and 22 of the motor assembly of FIG. 1 are attached to hub 12 and disposed around opposite ends of motor shaft 25. Each of the sleeve members 21 and 22 has a cylindrical opening which is slightly larger than the diameter of the portion of motor shaft 25 which it is disposed around. This results in a gap 18 formed between motor shaft 25 and the associated sleeve member (e.g., 21 or 22). Note that in FIG. 1, gap 18 is illustrated as being associated with sleeve member 21 and also with sleeve member 22. Although in the embodiment of FIG. 1 the gap associated with each sleeve member is equal in dimension, it should be understood that in other embodiments this may not be the case.

The basic operating principles of the motor illustrated in FIG. 1 are as follows. When electrical power is applied to the motor via coils 10, hub 12 rotates relative to motor shaft 25 by virtue of the electromagnetic forces generated from the interaction of stator 26, coil 10, and magnets 15.

The static axial or thrust load (preload) of the motor is supported by the step on the motor shaft 25 and by the magnetics itself. In this respect, it should be understood that the assemblies of FIGS. 1–3 are shown on their sides. Normally, motor shaft 25 rests along a vertical axis and the rotation of hub 12 is in a longitudinal plane.

The radial and axial load of the motor in a dynamic condition, on the other hand, is carried by the magnetics and mechanics of gaps 14 and 18. As hub 12 rotates relative to motor shaft 25, the magnets 15 and gaps 14 and 18 push or pull the total dynamic load and relocate it to an axially neutral position, while the separations between sleeve members 21 and 22 and motor shaft 25 maintain radial stiffness. Thus, a magnetomechanical bearing system is created for the motor of FIG. 1.

It is imperative that the inner cylindrical wall of sleeve members 21 and 22 are extremely smooth along with the outer surface of motor shaft 25. Of course, the other critical factors which are important for proper operation include the actual spacing of gaps 14 and 18, the area of the exposed surface associated with sleeve members 21 and 22, the size of the disk drive unit (e.g., 5.25 inch, 3.5 inch, etc.), and the speed of rotation of the hub 12 about motor shaft 25. In practice, the size of gap 18 is calculated based on each of these factors. For example, the gap 18 dimension may vary depending on the size of the motor employed or the speed of rotation. In one embodiment, for instance, for a 3.5 inch drive that rotates at a speed of 7200 rpm, the dimension of gap 18 is in the range of 200 to 600 micro inches. Note that sleeve members 21 and 22 preferably comprise aluminum or a high quality engineering plastic with a very smooth surface area. Obviously, other materials having similar properties can be used.

Alternative embodiments of the present invention are discussed later with reference to FIGS. 2, 3, 9, and 11. These embodiments use the same fundamental principles as described above with reference to FIG. 1 in various ways to suit different disk-drive requirements. The physical principles at work in the motors of FIGS. 1, 2, 3, 9, and 11 are graphically illustrated in the plots of FIGS. 4 and 5. FIG. 4 shows the conceptual relationship between air pressure and gap spacing as developed for a given rotational speed. Different rotational speeds have somewhat different characteristics. FIG. 5 shows the conceptual relationship between air pressure and disk radius as developed at a typical gap spacing for a given number of rotational speeds.

The basic principle of operation of an air-bearing in a disk-drive can be explained by the following experimental setup and the results obtained therefrom. This investigation is carried out with an aim to the use of air as a lubricant, and at the same time to develop sufficient axial and radial forces to hold the read-write track in the proper position according to requirements. The amount of force developed depends on the various design parameters which can be optimized according to different situations.

If a smooth disk rotates about a rotational axis 101 on a fixed smooth surface as shown in FIG. 6(a), the fluid or air between the gap 48 is forced out of the gap 48 due to the development of centrifugal force, thus creating a pressure difference between the disk and the surroundings. Consequently, an average attractive or repulsive force is developed inside the gap 48 in dynamic conditions depending upon the size of gap 48.

The amount of force developed by this phenomenon depends on the speed of rotation, diameter of the rotating disk or the tangential velocity, the spacing of the gap 48 between the disk and the surface, and the surface condition. In short, the amount of force depends on the average pressure difference between the disk and the surroundings.

The experimental data shown in FIG. 5 is the pressure developed at particular gaps at various speeds of rotation (n) and at different radial positions. The developed force as described above is in a perpendicular direction to the surface. The direction of the force can be resolved into two perpendicular components according to requirements by adjusting design parameters in the radial and axial directions in order to hold the rotating part in proper position in a dynamic condition. As shown in FIG. 6(b), this can be achieved by making the rotating and non-rotating flat parts of FIG. 6(a) into conical shapes. FIG. 6(b) shows a resulting rotating part 42 and non-rotating part 43.

This mechanism will maintain the concentric position of the rotating part 42 in static and dynamic conditions with respect to the rotational axis 101. Moreover, upon any radial shock, vibration, or unbalanced load which may influence the rotating part 42 to shift the rotational axis 101 in a horizontal direction from the dynamic equilibrium (thereby causing a variation in the gap thicknesses), the uneven pressure development will consequently force the rotating part 42 back to a dynamic equilibrium position.

The disk drive spindle motor may be configured to effectively work at any condition or configuration, such as horizontal, vertical, upside down, upright, etc. To obtain this flexibility, two conical shaped bearings are used on both sides of the rotating part 42, as shown in FIGS. 6(c) and 6(d). Looking at FIGS. 6(c) and 6(d), only the thickness of the gap 48 will control the position of the rotating part 42 with respect to the rotational axis 101 because all other parameters are kept constant by the initial design. This two-bearing mechanism will create a dynamic equilibrium and an axial stiffness which satisfies the pre-loading requirement.

Looking now at FIG. 7, a small variable clearance should be maintained to float the rotating part 42 in the rotating condition. In the static condition, the rotating part 42 sits on the lower portion 11 or the upper portion 14 of the non-rotating parts, thus holding a difference in gap thickness which is predetermined as shown in FIGS. 7(a), 8(a), and 10(a). In the rotating condition, the difference in gap thickness will create a difference in pressure on the upper portion 14 and lower portion 11 surfaces and cause a differential force development, which will hold the rotating part 42 on the air cushion at any configuration. Moreover, in the horizontal condition, the small clearance between the rotating part 42 and the non-rotating parts will allow the rotating part 42 to be off axis, and this will create a difference in gap thickness between the upper portion 14 and lower portion 11 of the non-rotating parts. The resulting difference in force, however, will push the rotating part 42 to the original rotating axis.

A spiral groove on the rotating or non-rotating parts may be used to enhance the performance, especially at low rotational speeds and in compact designs. A spiral groove air-bearing is preferable, as shown in FIGS. 8 and 10. Placement of the groove on the rotating or on the stationary part may not create a great difference in performance as long as the spacing with the plane surface is very small. The depth and width of the groove, however, will highly effect the stiffness of the bearing.

With reference now to FIGS. 2 and 3, two alternative embodiments of the present invention are shown which include all of the basic elements of the embodiment of FIG. 1, except that the designs of the lower sleeve members (shown at 21 and 48 in FIG. 1) are modified. In the motor assemblies of FIGS. 2 and 3, the lower bearing comprises a stationary lower base 43 and a stationary upper base 44. Preferably, lower and upper bases 43 and 44 comprise aluminum or plastic, and are securely mounted to motor shaft 25. Lower base 43 has a vertical surface 49, and upper base 44 has a vertical surface 50. The two vertical surfaces 49 and 50 are substantially parallel to the outer cylindrical surface of motor shaft 25.

Lower base 43 and upper base 44 also have radially or laterally extending axial surfaces, shown at 103 and 105, respectively. As is clearly seen, the plane of each laterally extending axial surface forms an angle with the vertical axis of motor shaft 25. This means that the laterally extending axial surface 103 of base 43 and laterally extending axial surface 105 of base 44 are essentially conical in shape. By way of example, in a current embodiment, laterally extending axial surface 103 of base 43 and laterally extending axial surface 105 of base 44 each make an angle of approximately 60 to 80 degrees with respect to the vertical axis of motor shaft 25.

The design of sleeve member 42 is also altered in the embodiments of FIGS. 2, 3, 9, and 11 such that the sleeve member 42 has surfaces which are substantially coextensive and parallel with the laterally extending axial surface 103 of base 43 and the laterally extending axial surface 105 of base 44. Sleeve member 42 is affixed to hub 12 such that it rotates with hub 12 during normal operation. Aluminum or plastic is used for sleeve member 42 in order to provide for compatible thermal expansion properties with hub 12. Sleeve member 42 also has an inner wall cylindrical surface which is substantially parallel to that of motor shaft 25.

The operational principles of the motors of FIGS. 2, 3, 9, and 11 are basically the same as those described above in conjunction which FIG. 1. A difference, however, in the static condition is that the whole rotating hub rests on the circular groove surface of thrust bearing 11 in the case of an upright condition and on the surface of thrust bearing 14 in the case of an upside-down condition. The surfaces of thrust bearings 11 and 14 are essentially covered with dry lubricated plastic or ceramic, as shown in FIG. 7(a). At the initial starting, the total load is supported on the plastic or ceramic thrust bearings 11 and 14. When the motor speeds up, these thrust bearings lose contact due to pressure development in gap 48. During normal operating conditions, a pressurized air film carries the load. Accordingly, the air-bearing system of the present invention relies upon the fact that two extremely smooth surfaces rotating relative to one another generate a boundary layer of pressurized air there between.

In the case of the motor assemblies of FIGS. 2, 3, 9, and 11, a pressurized air film develops in gap 48 over the conical surfaces between base and sleeve members 42, 43, and 44. This pressurized air film supports the axial and radial forces of the rotating hub, as described above. In a static condition the average gap thickness is typically less than 0.002 inch in an upright or upside down condition.

In addition, the pressurized air film developed in the gap 48 separates the laterally extending axial surface 103 of lower base 43 from the lower surface of sleeve member 42 and the upper surface of sleeve member 42 from the laterally extending axial surface 105 of base 44. The pressurized air film within gap 48 has both axial and radial components which function to prevent shifting of the hub from its rotating axis when rotating. The pressurized air film within gap 48 also supports the axial or thrust load of the motor. In the embodiment of FIGS. 2, 3, 9, and 11, the magnetics of the system are relied upon for this type of support. Also, note that the lower bearing assembly in FIGS. 2, 3, 9, and 11 includes vertical portions 18, 49, and 50 which further increase the stability of the rotating hub from axial deflections. Practitioners in the art, however, will appreciate that members 18, 49, and 50 may be excluded in certain implementations without adversely affecting performance.

With specific reference to FIGS. 9 and 11, two more embodiments of the present invention are shown which include all of the basic elements of the embodiments of FIGS. 1, 2, and 3 except that the design of the lower sleeve members has been modified, as shown in FIGS. 8 and 10. The bearing systems described in these embodiments contain spiral grooves on the surfaces of the lower and upper bases 43 and 44 (FIG. 8) or on the surface of the sleeve member 42 (FIG. 10). This conversion enhances the scope of performance, but requires a little more power at the spin up condition and may create noise and vibration due to the fluctuation in the pressurized air layer. These problems, however, can be reduced sufficiently by proper design. This design has flexibility in speed, load carrying capacity, and compactness, all of which are desirable in disk drives.

The design of lower and upper bases 43 and 44 is altered in this embodiment such that the laterally extending axial surfaces 103 and 105 are spiral grooved with a depth of 0.004 to 0.04 inch and a width of 0.04 inch minimum as shown in detail in FIG. 8. The spirally grooved surfaces are depicted at reference numeral 51. The assembled condition is shown in FIG. 9. In this design the stiffness of the bearing can be optimized by changing the static gap thickness between the surfaces of the rotating and stationary parts.

The above design can be made more compact by forming a spiral groove on both surfaces of the rotating sleeve 42 of FIG. 11, instead of on lower and upper bases 43 and 44. Details of the design features are shown in FIG. 10. This non contact type of bearing is wear free and produces a very low level of noise and vibration, and is further able to achieve very high rotational speeds and long life as compared to prior art-bearing systems.

Whereas many alternations and modifications to the present invention will no doubt become apparent to the person of ordinary skill in the art after having read the foregoing description, it is to be understood that the particular embodiments shown and described by way of illustration are in no way intended to be limiting. Therefore, reference to the details of the illustrated diagrams is not intended to limit the scope of the claims which themselves recite only those features regarded as essential to the invention.

What is claimed is:

1. A motor assembly for use in a magnetic disk drive system comprising:

a cylindrical shaft;

a stator secured to said shaft, said stator having an electromagnetic coil disposed upon the longitudinal axis of said shaft;

a rotatable hub housing said shaft and said stator;

a magnetic means attached to said hub disposed radially about said stator for interfacing electromagnetically with said coil to rotate said hub relative to said shaft;

first and second cylindrical sleeve members affixed to said hub and disposed about respective first and second ends of said shaft, with said stator being disposed between said first and second cylindrical sleeve members;

said sleeve members each having an inner air-bearing surface with a radial dimension which is slightly larger than the radial dimension of said shaft such that a gap exists between said shaft and each of said sleeve members, wherein the rotational movement of said hub relative to said shaft causes a pressurized air film to develop within said gaps.

2. The motor assembly of claim 1 wherein said radial dimensions of said sleeve members are optimized for the particular area of said inner surfaces and a predetermined rotational speed of said hub such that a lateral movement of said hub during operation produces an increase in pressure in one region of said air film and a decrease in pressure in another region of said air film, said increase and decrease in pressure being produced on opposite sides of said shaft to thereby resist said lateral movement.

3. The motor assembly of claim 1 wherein said gap is in the range of 200–600 micro inches for a rotational speed greater than or equal to approximately 2000 rpm.

4. The motor assembly of claim 1 wherein said hub comprises a non-ferromagnetic material.

5. The motor assembly of claim 3 further comprising a hollow cylinder disposed within said hub about said magnet means, said hollow cylinder being substantially aligned with said shaft and comprising a ferromagnetic material such that said hollow cylinder forms a flux path for said magnet means.

6. The motor assembly of claim 5 wherein said hub comprises aluminum.

7. The motor assembly of claim 6 wherein said sleeve members comprise aluminum, plastic, or ceramic.

8. A motor assembly for use in a magnetic disk drive recording system comprising:
- a stationary motor shaft having a cylindrical outer surface and first and second ends;
- a first stationary base having a first cylindrical opening provided therein and a laterally extending first axial surface, said first end of said shaft being disposed within said first cylindrical opening;
- a second stationary base having a second cylindrical opening provided therein and a laterally extending second axial surface, said first end of said shaft being disposed within said second cylindrical opening, said first and second axial surfaces facing one another;
- a stator secured to said shaft, said stator having an electromagnetic coil disposed about the longitudinal axis of said shaft;
- a rotatable hub housing said shaft and said stator;
- a magnetic means attached to said hub disposed radially about said stator for interfacing electromagnetically with said coil to rotate said hub relative to said shaft;
- a first cylindrical sleeve member affixed to said hub and disposed about said second end of said shaft, said first sleeve member having an inner air-bearing surface of a first predetermined radial dimension which is slightly larger than the radial dimension of said shaft at said second end such that a first gap exists between said shaft and said first sleeve member;
- said stator disposed between said first stationary base and said first cylindrical sleeve;
- a second cylindrical sleeve member affixed to said hub and disposed about said first end of said shaft, and second sleeve member having an inner air-bearing surface of a second predetermined radial dimension which is slightly larger than the radial dimension of said shaft at said first end such that a second gap exists between said shaft and said second sleeve member, said second sleeve member also having two sleeve aligning surfaces which are substantially coextensive with said first and said second axial surfaces of said first and second bases, said sleeve aligning surfaces and said axial surfaces disposed at an angle with respect to the longitudinal axis of said shaft such that said sleeve aligning surfaces and said axial surfaces resist radial and axial movement of said hub relative to said shaft;
- wherein the rotational movement of said hub relative to said shaft causes a pressurized air film to develop within said first and second gaps, and also between said sleeve aligning and said axial surfaces.

9. The motor assembly of claim 8 wherein said sleeve aligning surfaces and said axial surfaces are both conical in shape, and wherein said sleeve aligning surfaces are one of plane shaped and groove shaped.

10. The motor assembly of claim 9 wherein said sleeve aligning surfaces and said axial surfaces are disposed at an angle with respect to the longitudinal axis of said shaft, said angle being in the range of 65-80 degrees.

11. The motor assembly of claim 10 wherein said first and second predetermined radial dimensions are each optimized based on the area of said inner surfaces and the rotational speed of said hub.

12. The motor assembly of claim 11 wherein said first and second gaps are equal in dimension.

13. The motor assembly of claim 12 wherein said first and second gaps are in the range of 200 to 600 micro inches.

14. The motor assembly of claim 13 wherein said hub comprises a non-ferromagnetic material.

15. The motor assembly of claim 14 further comprising a hollow cylinder disposed within said hub about said magnet means, said hollow cylinder being substantially aligned with said shaft and comprising a ferromagnetic material such that said hollow cylinder forms a flux path for said magnet means.

16. The motor assembly of claim 15 wherein said hub comprises aluminum.

17. The motor assembly of claim 16 wherein said first and second sleeve members comprise material selected from the group consisting of aluminum, plastic, and ceramic.

18. The motor assembly of claim 9 wherein said base and said hub comprise materials which have substantially the same coefficient of thermal expansion.

19. An air-bearing motor assembly for a disk drive recording system comprising:
- a stationary motor shaft having a cylindrical outer surface and first and second ends;
- a first stationary base having a first cylindrical opening provided therein and a laterally extending first axial surface, said second end of said shaft being disposed within said first cylindrical opening;
- a second stationary base having a second cylindrical opening provided therein and a laterally extending second axial surface, said second end of said shaft being disposed within said second cylindrical opening, said first and second axial surfaces facing one another;
- a stator secured to said shaft, said stator having an electromagnetic coil disposed about the longitudinal axis of said shaft;
- a rotatable hub housing said shaft and said stator, said hub including an upper plate having a laterally extending axial surface;

a magnetic means attached to said hub disposed radially about said stator for interfacing electromagnetically with said coil to rotate said hub relative to said shaft;

a first cylindrical sleeve affixed to said hub and disposed about said first end of said shaft, said first sleeve member having an inner air-bearing surface of a first radial dimension which is slightly larger than the radial dimension of said shaft at said first end such that a first gap is created between said shaft and said sleeve member, said first sleeve member also having an additional bearing surface which is substantially coextensive with said axial surface of said upper plate;

said stator disposed between said first stationary base and said first cylindrical sleeve;

a second cylindrical sleeve member affixed to said hub disposed about said second end of said shaft, said second sleeve member having an inner bearing surface of a second radial dimension which is slightly larger than the radial dimension of said shaft at said second end such that a second gap is created between said shaft and said second sleeve member, said second sleeve member also having two additional bearing surfaces which are substantially coextensive with said first and second axial surfaces of said first and second bases, said axial surfaces and said additional bearing surfaces of said second sleeve member form an angle with the longitudinal axis of said shaft such that said axial surfaces and said additional bearing surfaces of said second sleeve member resist radial and axial movement of said hub relative to said shaft;

wherein the rotational movement of said hub relative to said shaft causes a pressurized air film to develop within said first and second gaps and between said additional bearing surfaces.

20. The motor assembly of claim 19 wherein said additional bearing surfaces and said axial surfaces relating to said second sleeve member are conical in shape.

21. The motor assembly of claim 20 wherein said additional bearing surfaces of said first sleeve member have a relatively smaller surface area as compared to said additional bearing surfaces of said second sleeve member.

22. The motor assembly of claim 21 wherein said axial surfaces and said additional bearing surfaces relating to said second sleeve member form an angle with the longitudinal axis of said shaft, said angle being in the range of 50–80 degrees.

23. The motor assembly of claim 22 wherein said first and second gaps are equal in dimension.

24. The motor assembly of claim 19 wherein said second sleeve member comprises a third additional bearing surface and a fourth additional bearing surface, both surfaces being substantially perpendicular with said stationary motor shaft.

25. The motor assembly of claim 24 wherein said rotatable hub rests on said third additional bearing surface in the case of an upright static condition and on the fourth additional bearing surface in the case of an upside-down static condition.

* * * * *